US010538655B2

(12) United States Patent
Desille et al.

(10) Patent No.: US 10,538,655 B2
(45) Date of Patent: Jan. 21, 2020

(54) BAMBOO FIBERS REINFORCED POLYPROPYLENE COMPOSITIONS

(71) Applicant: TOTAL RESEARCH & TECHNOLOGY FELUY, Seneffe (BE)

(72) Inventors: Gabriel Desille, Nivelles (BE); Caroline Schils, Sint-Martens-Lennik (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 0 days.

(21) Appl. No.: 14/776,295

(22) PCT Filed: Mar. 19, 2014

(86) PCT No.: PCT/EP2014/055466
§ 371 (c)(1),
(2) Date: Sep. 14, 2015

(87) PCT Pub. No.: WO2014/147103
PCT Pub. Date: Sep. 25, 2014

(65) Prior Publication Data
US 2016/0040001 A1 Feb. 11, 2016

(30) Foreign Application Priority Data

Mar. 19, 2013 (EP) ...................................... 13160018
Jan. 13, 2014 (EP) ...................................... 14150945

(51) Int. Cl.
*C08L 23/14* (2006.01)
*C08L 23/10* (2006.01)
*C08L 23/12* (2006.01)
*C08J 5/04* (2006.01)

(52) U.S. Cl.
CPC ................. *C08L 23/14* (2013.01); *C08J 5/04* (2013.01); *C08L 23/10* (2013.01); *C08L 23/12* (2013.01); *C08J 2323/14* (2013.01); *C08J 2401/02* (2013.01); *C08J 2423/12* (2013.01); *C08L 2205/03* (2013.01); *C08L 2205/16* (2013.01); *C08L 2207/02* (2013.01)

(58) Field of Classification Search
CPC ........... C08L 23/12; C08L 97/02; C08L 23/16
See application file for complete search history.

(56) References Cited

U.S. PATENT DOCUMENTS

| | | | | |
|---|---|---|---|---|
| 4,409,345 A | * | 10/1983 | Moteki ................... | C08L 23/06 524/13 |
| 4,740,551 A | * | 4/1988 | Foster ...................... | B01J 3/008 525/243 |
| 5,221,782 A | * | 6/1993 | Aida ........................ | C08K 5/01 524/451 |
| 5,882,745 A | * | 3/1999 | Mi ............................ | B27N 3/04 156/61 |
| 6,657,024 B1 | * | 12/2003 | Blackmon ............ | B01J 31/0212 502/103 |
| 2003/0187102 A1 | * | 10/2003 | Medoff .................. | A01N 25/10 524/9 |
| 2005/0058822 A1 | * | 3/2005 | Ittel ......................... | B32B 27/12 428/304.4 |
| 2009/0105397 A1 | * | 4/2009 | Van Riel ................ | C08F 297/08 524/505 |
| 2009/0321981 A1 | * | 12/2009 | Hopkins ................. | C08L 97/02 264/128 |
| 2010/0087592 A1 | * | 4/2010 | Masarati ................. | C08L 23/10 524/584 |
| 2010/0190891 A1 | * | 7/2010 | Eichinger ................ | C08L 1/00 524/35 |
| 2010/0331458 A1 | * | 12/2010 | Cernohous .............. | C08L 51/06 524/14 |
| 2011/0082257 A1 | * | 4/2011 | Carnahan ............ | C08F 297/083 525/88 |
| 2011/0305886 A1 | * | 12/2011 | Phan ........................ | B32B 9/02 428/201 |
| 2012/0034838 A1 | * | 2/2012 | Li .......................... | D04H 1/4291 442/401 |
| 2012/0157631 A1 | | 6/2012 | Tsou et al. | |
| 2012/0259046 A1 | * | 10/2012 | Pham ............... | G01N 27/44721 524/141 |
| 2013/0101771 A1 | * | 4/2013 | Masarati ................ | B82Y 30/00 428/36.4 |
| 2015/0010765 A1 | * | 1/2015 | Munro .................... | C08L 53/00 428/516 |
| 2015/0119503 A1 | * | 4/2015 | Ryu ........................ | C08L 23/10 524/15 |

FOREIGN PATENT DOCUMENTS

| | | |
|---|---|---|
| EP | 1950242 A1 | 7/2008 |
| WO | 2009111272 A2 | 9/2009 |

OTHER PUBLICATIONS

Tay et al. (Polymer-Plastics Technology and Engineering, 51, 208-213, 2012).*

(Continued)

*Primary Examiner* — Liam J Heincer
(74) *Attorney, Agent, or Firm* — Albert Shung

(57) ABSTRACT

A bamboo fibers reinforced polypropylene composition may include at least 50 wt % of a heterophasic propylene copolymer; from 2 to 40 wt % of bamboo fibers; and from 0.1 to 10 wt % of a coupling agent. The composition may show a melt flow index that is at least 5 g/10 min at 190° C. under a load of 2.16 kg according to ISO 1133, condition L; a density that is in the range of 0.900 and 1.010 g/cm$^3$ according to ISO 1183; and a flexural modulus is in the range of 1100 MPa and 4000 MPa according to ISO 178. The composition may be prepared by mixing and kneading, and may be used to form articles.

19 Claims, No Drawings

(56) References Cited

OTHER PUBLICATIONS

Chattopadhyay et al. (Journal of Applied Polymer Science, 119, 1619-1626, 2011).*
Material Data Center (Datasheet TITANPRO SM950, 2016).*
Renner et al. (Composites Science and Technology 70, 2010, 1141-114).*
Feng et al. (Polymer Composites, 2001, 22(4) 506-517) (Year: 2001).*
C. W. Lin, "Modification of Polypropylene by Peroxide-Catalysed Grafting of Maleic Anhydride for Adhesive Bonding: Surface and Interface" J. Mater. Sci., Lett., 12, 612-614 (1993).
International Search Report issued in PCT/EP2014/055466, dated May 28, 2014, 4 pages.
Plastics Additives Handbook, ed. H. Zweifel, 5th edition, 2001, Hanser Publishers.

* cited by examiner

BAMBOO FIBERS REINFORCED POLYPROPYLENE COMPOSITIONS

CROSS-REFERENCE TO RELATED APPLICATIONS

This application is a National Stage Entry of PCT/EP2014/055466, filed on Mar. 19, 2014, which claims priority from EP 13160018.1, filed on Mar. 19, 2013 and from EP 14150945.5, filed on Jan. 13, 2014, the entireties of which are incorporated herein by reference.

FIELD OF THE INVENTION

The invention relates to bamboo fibers-reinforced polypropylene compositions. The invention also relates to process of production of such compositions. Additionally, it relates to products comprising such bamboo fibers-reinforced polypropylene compositions.

The Technical Problem and Prior Art

Polypropylene and polypropylene-based compositions are commonly employed in structural applications in automobiles.

A known solution to address the performance needs of polypropylene compositions is to introduce elastomeric components or talc into the composition to enhance toughness and impact behavior. Another possibility is to introduce fibers such as glass fibers or natural fibers. Indeed, the fibers-reinforced plastics show higher strength and stiffness than non-reinforced plastics. For example, US2012/0157631 describes a fibers-reinforced polypropylene/elastomeric composite comprising fibers of a solid, flexible material grafted to the propylene polymer, the fibers being present in the range of 10 wt % to 80 wt % based on the total weight of the composite.

EP1950242 relates to hybrid composites of polypropylene with reinforcing agents. The polypropylene employed, BG055A1, is a heterophasic propylene polymer showing a tensile modulus of 1850 Mpa. In order to achieve a good balance of tensile properties and impact properties, the heterophasic propylene polymer is reinforced with both organic and inorganic reinforcing agents. The reinforcing organic agent is preferably polyethylene terephthalate (PET) fibers, with a fiber length of 4 to 6 mm.

Several industries, such as the automobile industry are required to use bio's material such as recycled material, natural fibers filled grades and "bio" polymers. However it is difficult to obtain the stiffness required for products intended for the automobile industry in respecting the other properties with recycled materials. Indeed recycled materials are known to have odor performances which aren't compliant with automotive standards. So there is a need for new fibers-reinforced polypropylene compositions that can be qualified as bio's materials from one hand and that meets the automotive manufacturer specifications, for example impact and stiffness.

Moreover, the automotive industry is also facing regulatory limits for emissions of $CO_2$, which turn to a constant search to reduce the vehicle weight. Thus, there is a need to reduce the weight of the plastic articles used as interior or exterior trim, part or structure of an automobile, and therefore a need for material usable to form such plastic articles that show good properties in terms of strength and stiffness with a reduced weight. Preferably, such material should be suitable for injection molding and/or should show improved impact properties.

Therefore, a general problem for propylene compositions used in these applications is to reconcile the opposed requirements of low density, high processability and good balance of stiffness and impact properties.

Bamboo has become a focus of interest in the recent years as a natural source of fibers for reinforcement of polyolefin, such as polypropylene or polyethylene. Bamboo offers the advantage of being a natural source of fibers. Bamboo is abundantly available in many countries. Bamboo is one of the fastest renewable plants with a maturity cycle of 3-4 years. Bamboo has excellent mechanical properties in comparison with its weight due to longitudinally aligned fibers.

U.S. Pat. No. 5,882,745 discloses polypropylene composite material in which propylene homopolymer is reinforced by the inclusion of bamboo fibers. The polypropylene composite shows a bamboo fibers' content ranging from 20 wt % to 60 wt % relative to the total weight of the polypropylene composite. With preference, the bamboo fibers' weight fraction is of about 50 wt % to about 60 wt %. The polypropylene composite comprises at least 16 wt % of maleated polypropylene to promote the bounding between the bamboo fibers and the polypropylene matrix.

Technological performance of bamboo reinforced polymer composition depends largely on fiber quality, fiber-polymer interface, and fiber-polymer mixing ratios. Therefore there is still a need for bamboo reinforced polymer composition showing improved mechanical properties together with a reduced weight.

BRIEF DESCRIPTION OF THE INVENTION

The inventors have found that at least one of the objectives mentioned above can be met by providing bamboo fibers-reinforced polypropylene composition comprising bamboo fibers in a content from 2 wt % to 40 wt % relative to the total weight of the polypropylene composition, wherein the propylene composition further comprises an heterophasic propylene polymer, and a coupling agent. The bamboo fibers-reinforced polypropylene compositions in accordance with the invention show the following properties:

the melt flow index is at least 5 g/10 min at 190° C. under a load of 2.16 kg;
the density is in the range of 0.900 and 1.010 g/cm³; and
the flexural modulus is in the range of 1100 MPa and 4000 MPa.

The inventive compositions show an improved density, i.e. a density lower than the known compositions, together with improved processability and good balance of stiffness and impact properties.

The inventive bamboo fibers-reinforced polypropylene composition comprises a heterophasic propylene copolymer, frequently also referred as "impact copolymers" or "propylene block copolymers".

It has been found that, for a given content of bamboo fibers, the inventive bamboo fibers reinforced propylene compositions show an improved tensile modulus, and/or an improved flexural modulus, compared to bamboo fibers reinforced compositions of prior art such as described in U.S. Pat. No. 5,882,745 for example. The compositions of the invention also show a better tensile strength than the known compositions. Heterophasic propylene polymers are known by the man skilled in the art to show lower tensile strength but better impact properties than propylene homopolymer. Thus the improvement not only of the impact properties but also of the stiffness properties was unexpected.

Moreover, and contrary to the teaching of U.S. Pat. No. 5,882,745 that requires at least 16 wt % of MAPP as coupling agent to achieve good mechanical properties (such as good tensile modulus and good tensile strength), the improved results of the inventive compositions are obtained with a content of the coupling agent which is below 10 wt %.

Compared to prior art reinforced compositions containing heterophasic propylene polymers, the inventive compositions also show improved results regarding tensile modulus and/or flexural modulus, as well as improved impact properties. Indeed, it has been found that the bamboo fibers possess stiffening properties higher than other organic fibers such as PET fibers (as described in EP1950242). Therefore, for a given content of fibers added in the composition, a better increase of stiffness properties can be obtained. This unexpected result allows using, as starting material, heterophasic propylene polymers having a lower tensile modulus, and/or flexural modulus, than in prior art, thus allowing an improvement of the impact properties of the final compositions.

Moreover, contrary to the teaching of EP1950242 according to which reinforcement of polypropylene with organic fibers cannot provide the desired balance of tensile and impact properties, so that a mix of organic and inorganic reinforcement agent is to be utilized, the inventive compositions achieve such balance with using organic reinforcement agent only. The possibility given by the invention to eliminate or minimize the use of inorganic reinforcement agent allows the obtaining of compositions with a lower density, thus reduced weight, compared to the known composition.

The bamboo fibers-reinforced polypropylene composition according to the invention shows an improved melt flow index of at least 5 g/10 min (190° C.-2.16 kg) to facilitate injection molding. Embodiments of inventive compositions show improvement in the flexural modulus compared to known compositions. The inventive compositions also deal with improved density in order to reduce the weight of the articles produced from such composition and/or improved impact properties compared to known compositions for similar applications.

The invention also relates to a process to produce such bamboo fibers-reinforced polypropylene composition.

The invention further relates to the use of such bamboo fibers-reinforced polypropylene composition for article, in particular molded articles, as well as articles comprising such bamboo fibers-reinforced polypropylene composition.

SUMMARY OF THE INVENTION

It is an object of the present invention to provide a bamboo fibers-reinforced polypropylene composition comprising:
a) at least 50 wt % relative to the total weight of the polypropylene composition of an heterophasic propylene copolymer;
b) from 2 to 40 wt % relative to the total weight of the polypropylene composition of bamboo fibers;
c) from 0.1 to 10 wt % relative to the total weight of the polypropylene composition of a coupling agent;
d) from 0 to 30 wt % relative to the total weight of the polypropylene composition of an inorganic filler;

said composition showing the following properties:
the melt flow index is at least 5 g/10 min at 190° C. under a load of 2.16 kg;
the density is in the range of 0.900 and 1.010 g/cm$^3$;
the flexural modulus is in the range of 1100 MPa and 4000 MPa.

Preferably, the tensile modulus of the inventive composition is in the range of 1100 MPa and 4000 MPa.

Moreover, the inventive composition shows suitable impact properties such as Charpy notched (at 23° C.) of at least 3 kJ/m$^2$, preferably at least 3.5 kJ/m$^2$. In an embodiment, the composition comprises from 2 to 17 wt % of bamboo fibers and the charpy impact strength notched at 23° C. according to ISO 179, is at least 8 kJ/m$^2$, preferably at least 10 kJ/m$^2$.

With preference, the inventive composition shows suitable impact properties such as Charpy notched (at −20° C.) of at least 3.5 kJ/m$^2$, preferably at least 4 kJ/m$^2$.

Preferably, the melt flow index of the composition, measured at 190° C. under a load of 2.16 kg is at least 5.5 g/10 min, preferably at least 6 g/10 min, more preferably at least 7 g/10 min.

The melt flow index of the composition can also be measured at 230° C. under a load of 2.16 kg and is at least 10 g/10 min, preferably 12 g/10 min, preferably at least 15 g/10 min, preferably at least 20 g/10 min, more preferably at least 25 g/10 min, most preferably at least 30 g/10 min.

The bamboo fibers-reinforcing propylene polymer composition comprises an heterophasic propylene copolymer, bamboo fibers and a coupling agent, which when taken together preferably comprise at least 70 wt % of the bamboo fibers-reinforcing propylene polymer composition, more preferably at least 80 wt %, or at least 90 wt %, or at least 95 wt % of the bamboo fibers-reinforcing propylene polymer composition. The remainder can for example be made up of additives and/or nucleating agents as defined below. The remainder can further comprise an inorganic filler.

The additives are such as for example antioxidants, light stabilizers, acid scavengers, lubricants, antistatic agents, fillers, nucleating agents, clarifying agents, colorants. An overview of useful additives is given in Plastics Additives Handbook, ed. H. Zweifel, 5th edition, Hanser Publishers.

Preferably, the heterophasic propylene copolymer may contain one or more nucleating agents. The nucleating agent used in the present invention can be any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these. The most preferred nucleating agents are talc, carboxylate salts, and phosphate ester salts.

In an embodiment, the heterophasic propylene copolymer is a blend of a heterophasic propylene copolymer with at least one polymer selected from an heterophasic propylene copolymer, a random copolymer, a propylene homopolymer.

In another embodiment, the heterophasic propylene copolymer is produced by means of a polymer blend comprising:
from 50 to 98 wt % by weight of the polymer blend, of a first polymer which is an heterophasic propylene copolymer showing a melt flow index measured at 230° C. under a load of 2.16 kg ranging from 5 to 25 g/10 min; and
from 2 to 50 wt % by weight of the polymer blend, of a second polymer which is an heterophasic propylene copolymer showing a melt flow index measured at 230° C. under a load of 2.16 kg over 25 g/10 min;

wherein the heterophasic propylene copolymer produced by means of such polymer blend shows a melt flow index measured at 230° C. under a load of 2.16 kg of at least 15 g/10 min, preferably at least 18 g/10 min, more preferably at least 20 g/10 min.

The heterophasic propylene copolymer comprises a polypropylene in a matrix phase and a rubber in a dispersed phase; wherein the polypropylene in the matrix phase comprises propylene and at most 1 wt %, relative to the total weight of said polypropylene composition, of one or more comonomers selected from the group consisting of ethylene and 04-010 alpha-olefins; and the rubber in the dispersed phase amount from at least 5 wt % to at most 30 wt % relative to the total weight of the heterophasic propylene copolymer.

With preference, the polypropylene which serves as matrix in the heterophasic propylene copolymer is a propylene homopolymer (i.e. with a comonomer content of 0 wt %) or a mini-random copolymer of propylene (i.e. with a comonomer content from 0.05 wt % to 1 wt %, with preference from 0.05 wt % to 0.5 wt %). With preference, the 04-010 alpha-olefins are selected from the group consisting of 1-butene, 1-pentene, 4-methyl-1-pentene, 1-hexene and 1-octene. Most preferably, the one or more comonomer is ethylene. Most preferably, the propylene polymer which serves as matrix in the heterophasic propylene copolymer is a propylene homopolymer.

The rubber consists of a copolymer of ethylene and at least one further olefin different from ethylene. Preferably, the at least one further olefin is selected from the group $C_3$-$C_{10}$ alpha-olefins. More preferably it is selected from the group consisting of propylene, 1-butene, 1-pentene, 4-methyl-1-pentene, 1-hexene and 1-octene. Even more preferably it is propylene or 1-butene. Most preferably it is propylene. Thus, the most preferred rubber is ethylene propylene rubber (EPR).

For the invention, the rubber has an intrinsic viscosity $\eta_R$ of at least 2.0 dl/g, measured in tetralin at 135° C. following ISO 1628. Preferably, the rubber has an intrinsic viscosity $\eta_R$ of at least 2.5 dl/g, more preferably of at least 3.0 dl/g, and of at most 5.5 dl/g, preferably of at most 5.0 dl/g and more preferably of at most 4.5 dl/g.

In an embodiment, the polypropylene composition comprises the rubber in an amount from at least 8 wt %, preferably at least 10 wt % relative to the total weight of the heterophasic propylene copolymer.

In another embodiment, the polypropylene composition comprises the rubber in an amount of at most 25 wt %, preferably at most 20 wt % relative to the total weight of the heterophasic propylene copolymer.

The bamboo fibers-reinforcing propylene polymer composition comprises an heterophasic propylene copolymer, shows the following properties:
  i. a melt flow index measured at 230° C. under a load of 2.16 kg of at least 15 g/10 min, preferably at least 18 g/10 min, more preferably at least 20 g/10 min;
  ii. a flexural modulus of at least 850 MPa, preferably at least 1000 MPa, more preferably at least 1100 MPa, most preferably at least 1300 MPa;
  iii. a density of at least 0.890 g/cm$^3$, preferably 0.900 g/cm$^3$.

The flexural modulus is at most 1800 MPa, preferably at most 1700 MPa, more preferably at most 1650 MPa.

The tensile modulus of the heterophasic propylene copolymer is at least 850 MPa, preferably at least 1000 MPa, more preferably at least 1100 MPa, most preferably at least 1300 MPa.

The tensile modulus is at most 1800 MPa, preferably at most 1700 MPa, more preferably at most 1650 MPa.

The heterophasic propylene copolymer is produced using a Ziegler-Natta catalyst.

The bamboo fibers show an average length of at most 1500 μm, preferably at most 1300 μm, more preferably at most 1000 μm, most preferably at most 800 μm.

An average length of bamboo fibers of at most 1500 μm, preferably 1000 μm is preferred to obtain good flexural modulus or to improve the flexural modulus on the bamboo fibers-reinforced polypropylene composition. An average length of bamboo fibers of at most 800 μm, preferably 500 μm is preferred to improve impact properties (i.e. the charpy impact strength notched at 23° C.) on the bamboo fibers reinforced polypropylene composition. However, good results regarding impact properties can also be achieved with bamboo fibers of at most 1500 μm.

The density of the bamboo fibers is at least 0.3 g/cm$^3$, preferably at least 0.4 g/cm$^3$, more preferably at least 0.5 g/cm$^3$, most preferably at least 0.6 g/cm$^3$. Preferably, the density of the bamboo fibers is ranging from 0.6 to 1.4 g/cm$^3$ and/or the water content of the fibers is at least 5 wt %, preferably at least 6 wt %. In accordance with the invention there is no need to dry the bamboo fibers before mixing them with the heterophasic propylene copolymer.

The bulk density of the bamboo fibers is at most 0.25 g/cm$^3$, preferably at most 0.22 g/cm$^3$.

In an embodiment, the bamboo fibers reinforced-polypropylene compositions comprise from 2 to 17 wt % of bamboo fibers, with preference from 3 wt % to 15 wt %, with preference from 5 wt % to 10 wt %.

In another embodiment of the invention, the bamboo fibers-reinforced polypropylene compositions comprise from more than 17 wt % to 40 wt %, preferably 18 to 40 wt % of bamboo fibers, with preference from 20 wt % to 35 wt %, with preference from 25 wt % to 30 wt %.

The coupling agent is preferably maleated polypropylene (MAPP). The coupling agent can be prepared by directly reactive mixing of polypropylene with maleic anhydride (MAH) and a peroxide initiator according to the method described in C. W. Lin, *J. Mater. Sci., Lett.*, 12, 612-614 (1993). The MAPP can also be bought from manufacturers. The coupling agent is selected to show a content of maleic anhydride of at least 1 wt %, preferably the content of maleic anhydride is ranging from 1 to 5 wt % of the maleated polypropylene composition.

With preference, the bamboo fibers reinforced polypropylene composition comprises at least 0.1 wt % relative to the total weight of the composition of a coupling agent, preferably at least 0.3 wt % most preferably at least 0.5 wt %, and/or at most 8 wt % relative to the total weight of the composition of a coupling agent, preferably at most 6 wt %, most preferably at most 5 wt %.

The inorganic filler is selected from the group consisting of: talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, and combinations thereof. With preference the inorganic filler is talc.

The presence of inorganic filler in the composition helps to increase the flexural modulus of articles produced from said composition, but will also increase its density.

With preference, the bamboo fibers reinforced polypropylene composition comprises from 1 to 30 wt % relative to the total weight of the composition of an inorganic filler, preferably from 5 to 20 wt %, and more preferably from 8 to 15 wt %.

It is another object of the invention to disclose a method for preparing a bamboo fibers reinforced polypropylene composition as defined above, comprising the steps of:

introducing the heterophasic polypropylene copolymer and the coupling agent into an extruder through a first feed port to form a mixture;

mixing the mixture to a molten state;

kneading the molted mixture with bamboo fibers and optionally inorganic filler, the bamboo fibers and the optional organic filler being introduced into the extruder through a second feed port located downstream the first feed port.

In a preferred embodiment, the bamboo fibers are not subjected to a pre-drying step before being introduced into the extruder. Therefore the bamboo fibers are introduced into the extruder in an unpre-dried state.

In another embodiment, the bamboo fibers are subjected to a pre-drying step before being introduced into the extruder, such pre-drying step being performed keeping the drying temperature below 100° C.

A further object of the invention is the use of a bamboo fibers reinforced polypropylene composition as defined above for the production of molded article, preferably injection molded articles.

The invention also discloses an article comprising a bamboo fibers-reinforced polypropylene composition as defined above. With preference, the article has been produced by injection molding.

With preference, the articles produced by injection molding in accordance with the invention show a tensile modulus of at least 1100 MPa and a tensile strength of at least 19 MPa.

Preferably said articles are selected from automotive trim, interior automotive trim, automotive structural element.

DETAILED DESCRIPTION OF THE INVENTION

Throughout the present application, the terms "polypropylene" and "propylene polymer" may be used synonymously.

The expression "% by weight" or "wt %" (weight percent), here and throughout the description, unless otherwise defined, refers to the relative weight of the respective component based on the overall weight of the formulation.
Preparation of the Heterophasic Propylene Copolymer The heterophasic propylene copolymers comprise a matrix propylene polymer phase and a dispersed phase of a rubber. With preference the rubber is ethylene propylene rubber.

The heterophasic propylene copolymers of the present invention as defined above are produced by sequential polymerization in a series of polymerization reactor in presence of a catalyst system, wherein in a first polymerization stage the propylene polymer is produced, and in a second polymerization stage the rubber is produced by copolymerizing ethylene and at least one further olefin different from ethylene. The catalyst system is added to the first polymerization stage.

The catalyst system comprises a Ziegler-Natta catalyst. The term "Ziegler-Natta catalysts" refers to catalysts of the general formula $MX_n$, wherein M is a transition metal compound selected from group IV to VII, wherein X is a halogen, and wherein n is the valence of the metal. Preferably the metal is titanium, chromium or vanadium. Most preferably, the metal is titanium.

The Ziegler-Natta catalyst system in accordance with the invention comprises a titanium compound having at least one titanium-halogen bond and an internal electron donor, both on a suitable support, an organoaluminium compound, and an optional external donor. A suitable support is for example a magnesium halide in an active form. A suitable external donor (ED) is for example a phtalate or a succinate or a diether compound.

The organoaluminium compound used in the process of the present invention is triethyl aluminium (TEAL). Advantageously, the triethyl aluminium has hydride content, expressed as $AlH_3$, of less than 1.0 wt % with respect to the triethyl aluminium. More preferably, the hydride content is less than 0.5 wt %, and most preferably the hydride content is less than 0.1 wt %. It would not depart from the scope of the invention if the organoaluminium compound contains minor amounts of other compounds of the trialkylaluminium family, such as triisobutyl aluminium, tri-n-butyl aluminium, and linear or cyclic alkyl aluminium compounds containing two or more Al atoms, provided they show polymerization behavior comparable to that of TEAL.

In the process of the present invention the molar ratio Al/Ti is not particularly specified. However, it is preferred that the molar ratio Al/Ti is at most 100.

If an external donor is present, it is preferred that the molar ratio Al/ED, with ED denoting external electron donor, is at most 120, more preferably it is in the range from 5 to 120, and most preferably in the range from 10 to 80.

Before being fed to the polymerization reactor the catalytic system preferably undergoes a premix and/or a pre-polymerization step. In the premix step, the triethyl aluminium (TEAL) and the external electron donor (ED)—if present—, which have been pre-contacted, are mixed with the Ziegler-Natta catalyst at a temperature in the range from 0° C. to 30° C., preferably in the range from 5° C. to 20° C., for up to 15 min. The mixture of TEAL, external electron donor (if present) and Ziegler-Natta catalyst is pre-polymerized with propylene at a temperature in the range from 10° C. to 100° C., preferably in the range from 10° C. to 30° C., for 1 to 30 min, preferably for 2 to 20 min.

In the first stage the polymerization of propylene and one or more optional comonomers can for example be carried out in liquid propylene as reaction medium (bulk polymerization). It can also be carried out in diluents, such as hydrocarbon that is inert under polymerization condition (slurry polymerization). It can also be carried out in the gas phase. Those processes are well known to one skilled in the art.

Diluents which are suitable for being used in accordance with the present invention may comprise but are not limited to hydrocarbon diluents such as aliphatic, cycloaliphatic and aromatic hydrocarbon solvents, or halogenated versions of such solvents. Nonlimiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

For the present invention the propylene polymers are preferably produced by polymerization in liquid propylene at temperatures in the range from 20° C. to 100° C. Preferably, temperatures are in the range from 60° C. to 80° C. The pressure can be atmospheric or higher. Preferably the pressure is between 25 and 50 bars.

Hydrogen is used to control the chain lengths of the propylene polymers. For the production of a propylene polymer with higher MFI, i.e. with lower average molecular weight and shorter polymer chains, the concentration of hydrogen in the polymerization medium needs to be increased. Inversely, the hydrogen concentration in the polymerization medium has to be reduced in order to produce a propylene polymer with lower MFI, i.e. with higher average molecular weight and longer polymer chains.

In an embodiment of the invention, the propylene polymer matrix comprises at least two propylene homopolymer fractions of different melt flow index, wherein the ratio of the melt flow index of the fraction with the highest melt flow index and the melt flow index of the fraction with the lowest melt flow index is in the range from 3 to 400. Such bimodal propylene homopolymer is preferably produced in a polymerization unit having two loop reactors in series.

In such a sequential arrangement of polymerization reactors, the propylene homopolymer withdrawn from one reactor is transferred to the one following in the series, where the polymerization is continued. To produce propylene homopolymer fractions of different index, the polymerization conditions in the respective polymerization reactors need to be different, for example in that the hydrogen concentration in the polymerization reactors differs.

The melt flow index ($MFI_2$) of the propylene polymer produced in the second reactor is calculated using:

$$\mathrm{Log}(MFI_{final}) = w_1 \cdot \mathrm{Log}(MFI_1) + w_2 \cdot \mathrm{Log}(MFI_2)$$

wherein $MFI_{final}$ is the melt flow index of the total propylene polymer produced, $MFI_1$ and $MFI_2$ are the respective melt flow index of the propylene polymers fractions produced in the first and the second polymerization loop reactors, and $w_1$ and $w_2$ are the respective weight fractions of the propylene polymers produced in the first and in the second polymerization loop reactors as expressed in wt % of the total propylene polymer produced in the two polymerization loop reactors. These weight fractions are commonly also described as the contribution by the respective loop.

The matrix propylene polymer, preferably propylene homopolymer, can be made for example in loop reactors or in a gas phase reactor. The propylene polymer produced in this way, in a first polymerization stage, is transferred to a second polymerization stage, into one or more secondary reactors where ethylene and at least one further olefin different from ethylene are added to produce the rubber. For example the further olefin is polypropylene. Thus the rubber produced is ethylene propylene rubber (EPR). Preferably this polymerization step is done in a gas phase reactor.

The propylene copolymer can be prepared using a controlled morphology catalyst that produces rubber spherical domains dispersed in a polypropylene matrix. The amount and properties of the components are controlled by the process conditions.

The average molecular weight of the rubber, for which the intrinsic viscosity $\eta_R$ is a measure, is controlled by addition of hydrogen to the polymerization reactors of the second polymerization stage. The amount of hydrogen added is such that the rubber as a intrinsic viscosity 2.0 dl/g, and of at most 5.5 dl/g, measured in tetralin at 135° C. following ISO 1628.

The contribution of the second polymerization stage, i.e. the rubber content of the heterophasic propylene copolymer is from 5 to 50 wt % relative to the total weight of the heterophasic propylene copolymer.

The heterophasic propylene copolymers according to the invention may contain additives such as, by way of example, antioxidants, light stabilizers, acid scavengers, flame retardants, lubricants, antistatic additives, nucleating/clarifying agents, colorants. An overview of such additives may be found in Plastics Additives Handbook, ed. H. Zweifel, $5^{th}$ edition, 2001, Hanser Publishers.

The antioxidants used in the heterophasic propylene copolymers of the present invention preferably have anti-gas fading properties. The preferred antioxidants are selected from the group consisting of phosphites, hindered phenols, hindered amine stabilizers and hydroxylamines. An example for a suitable antioxidant additivation is a blend of Irgafos 168 and Irganox 3114. Alternatively, phenol-free antioxidant additivations are suitable as well, such as for example those based on hindered amine stabilizers, phosphites, hydroxylamines or any combination of these. In general the antioxidants are added to the propylene homopolymer in an amount from 100 ppm to 2000 ppm with the exact amount depending upon the nature of the antioxidant, the processing conditions and other factors.

Example of suitable heterophasic propylene copolymers are given in table 1. Such heterophasic propylene copolymers have a typical melt flow index over 15 g/10 min at 230° C. under a load of 2.16 kg.

After the last polymerization reactor the polymers are recovered as a powder and can then be pelletized or granulated.

Preparation of the Bamboo Fibers Reinforced Polypropylene Composition

The bamboo fibers reinforced polypropylene composition is prepared according to the invention by extrusion, on an extrusion compounding line. The compounding is done on twin screw extruder with a screw diameter of 26 mm and a ratio L/D=44. One or more heterophasic polypropylene copolymer and the coupling agent are added through a first feed port. The bamboo fibers as well as the optional inorganic filler are added through a second feed port located downstream, at a point where the plastic has melted already. This arrangement reduces the degradation by breaking of the bamboo fibers by the screws. The presence time of the bamboo fibers in the extruder is lower that the presence time of the heterophasic propylene copolymer. The extrusion temperature was 200° C. and the throughput was 25 kg/h.

The extrusion compounding technology is well known from the man skilled in the art and will not be further described.

Test Methods

The melt flow index was measured according to ISO 1133, condition L, using a weight of 2.16 kg and a temperature of 230° C. or 190° C.

A standard method to measure Xylene soluble is described in ISO 16152 (equivalent to ASTM D5492-10).

Xylene solubles (XS) were determined as follows: Between 4.5 and 5.5 g of propylene polymer were weighed into a flask and 300 ml xylene were added. The xylene was heated under stirring to reflux for 45 minutes. Stirring was continued for 15 minutes exactly without heating. The flask was then placed in a thermostated bath set to 25° C.+/−1° C. for 1 hour. The solution was filtered through Whatman n° 4 filter paper and exactly 100 ml of solvent were collected. The solvent was then evaporated and the residue dried and weighed. The percentage of xylene solubles ("XS") was then calculated according to XS(in wt %)=(Weight of the residue/Initial total weight of PP)*300 with all weights being in the same units, such as for example in grams.

Acetone insolubles are determined as follow: 100 ml of the filtrate of the solution in xylene (see above) and 700 ml of acetone are agitated overnight at room temperature in a hermetically sealed flask, during which time a precipitate is formed. The precipitate is collected on a metal mesh filter with a mesh width of 0.056 mm, dried and weighed. The percentage of acetone insolubles ("AcIns") is then calculated according to:

AcIns(in wt %)=(Weight of the residue/initial weight of PP)*300 with all weights being in the same units, such as for example in grams.

The amount of rubber in heterophasic propylene copolymer or in the polymer resulting from the polymer blend, is determined as the acetone insoluble fraction of the xylene soluble fraction.

The intrinsic viscosity of the rubber is determined using the acetone insoluble fraction of the xylene soluble fraction of the heterophasic propylene copolymer. The intrinsic viscosity is determined in a capillary viscometer in tetralin at 135° C.

The tensile modulus was determined according to ISO 527-2.

Flexural modulus was determined according to ISO 178.

Charpy Impact Strength (notched) at 23° C. or −20° C. was determined according to ISO 179.

Izod Impact Strength (notched) at 23° C. was determined according to ISO 180.

Density of the polypropylene or of the composition was determined according to ISO 1183.

EXAMPLES

The advantages of the bamboo fibers reinforced polypropylene compositions of the invention over those of the prior art are shown in the following examples.

Examples heterophasic propylene copolymers suitable for the invention, together with their properties are given in table 1.

TABLE 1

|  | unit | PPC1 | PPC2 | PPC3 | PPC4 |
| --- | --- | --- | --- | --- | --- |
| Melt flow index (230° C., 2.16 kg) | g/10 min | 18 | 25 | 50 | 70 |
| Tensile modulus | MPa | 870 | 1400 | 1150 | 1600 |
| Flexural modulus | MPa | 880 | 1300 | 1100 | 1500 |
| Density | g/cm$^3$ | 0.905 | 0.905 | 0.905 | 0.905 |
| Izod Impact Strength (notched) at 23° C. | kJ/m$^2$ | >50 | 7 | 13.5 | 6.5 |
| Charpy Impact Strength (notched) at 23° C. | kJ/m$^2$ | >50 | 8 | not measured | 6 |
| rubber content | wt % | 25 | 13 | 19 | 15.5 |
| rubber intrinsic viscosity | dl/g |  |  |  | 3.7 |

If blends are considered, heterophasic propylene copolymer with a melt flow index (230° C., 2.16 kg) below 15 g/10 min can be blended for example with PPC4 in order to produce a polymer blend suitable for the invention.

The Inventive Compositions

In the inventive below examples E1 to E6, the coupling agent is maleated polypropylene (MAPP). An example of commercially available maleated polypropylene is OREVAC® CA100 marketed by Arkema. Such maleated polypropylene shows the following properties:

a melt index (230° C./0.225 kg) of 10 g/10 min measured according to ISO 1133, a melting point of 167° C. measured in accordance to ISO 11357-3, a density of 0.905 g/cm3 measured according to ISO 1183, and a flexural Modulus of 880 MPa measured according to ISO 178.

E1 is a bamboo fibers reinforced polypropylene composition according to the invention comprising 30 wt % relative to the total weight of the polypropylene composition of bamboo fibers showing an average length of 1000 μm with a density ranging from 0.6 to 1.4 g/cm$^3$, has been produced using PPC4 as the heterophasic propylene copolymer and MAPP as coupling agent.

E2 is a bamboo fibers reinforced polypropylene composition according to the invention comprising 20 wt % relative to the total weight of the polypropylene composition of bamboo fibers showing an average length of 3000 μm with a density ranging from 0.6 to 1.4 g/cm$^3$, has been produced using PPC2 as the heterophasic propylene copolymer and MAPP as coupling agent.

E3 is a bamboo fibers reinforced polypropylene composition according to the invention comprising 10 wt % relative to the total weight of the polypropylene composition of bamboo fibers showing an average length of 1000 μm with a density ranging from 0.6 to 1.4 g/cm$^3$, has been produced using PPC1 as the heterophasic propylene copolymer and MAPP as coupling agent. The composition contains 2.5 wt % relative to the total weight of the polypropylene composition of MAPP. The charpy impact notched at −20° C. according to ISO 179 is 4.4 kJ/m$^2$.

E4 is a bamboo fibers reinforced polypropylene composition according to the invention comprising 5 wt % relative to the total weight of the polypropylene composition of bamboo fibers showing an average length of 1000 μm with a density ranging from 0.6 to 1.4 g/cm$^3$, has been produced using PPC1 as the heterophasic propylene copolymer and MAPP as coupling agent. The composition contains 1.5 wt % relative to the total weight of the polypropylene composition of MAPP. In this composition, the bamboo fibers have not been subjected to a pre-drying step before being introduced to the extruder. The charpy impact notched at −20° C. according to ISO 179 is 4.7 kJ/m$^2$.

E5 is a bamboo fibers reinforced polypropylene composition according to the invention comprising 5 wt % relative to the total weight of the polypropylene composition of bamboo fibers showing an average length of 1000 μm with a density ranging from 0.6 to 1.4 g/cm$^3$, has been produced using PPC1 as the heterophasic propylene copolymer and MAPP as coupling agent. The composition contains 1.5 wt % relative to the total weight of the polypropylene composition of MAPP. The charpy impact notched at −20° C. according to ISO 179 is 4.9 kJ/m$^2$.

E6 is a bamboo fibers reinforced polypropylene composition according to the invention comprising 5 wt % relative to the total weight of the polypropylene composition of bamboo fibers showing an average length of 1000 μm with a density ranging from 0.6 to 1.4 g/cm$^3$, has been produced using PPC3 as the heterophasic propylene copolymer and MAPP as coupling agent. The composition contains 1.5 wt % relative to the total weight of the polypropylene composition of MAPP. The charpy impact notched at −20° C. according to ISO 179 is 3.6 kJ/m$^2$.

C1 is a comparative example of bamboo fibers reinforced polypropylene injection resin comprising 30 wt % of bamboo fibers. Such resin is marketed as HU 30BF4 by Eurostar Engineering Plastics.

C2 is a comparative example of a propylene composition reinforced with talc. For E5, the bamboo fibers have been subjected to a pre-drying step at 80° C. before being introduced into the extruder, which was not the case for E3, E4 and E6. Without pre-drying step the fibers showed a water content of 9.78 wt %. After being subjected to pre-drying step, the fibers showed a water content of 2.05 wt %.

Their properties are reported on table 2.

TABLE 2

|  | unit | E1 | E2 | E3 | E4 | E5 | E6 | C1 | C2 |
|---|---|---|---|---|---|---|---|---|---|
| bamboo fibers content | wt % | 30 | 20 | 10 | 5 | 5 | 5 | 30 | — |
| average length of bamboo fibers | μm | 1000 | 3000 | 1000 | 1000 | 1000 | 1000 | unknown | — |
| inorganic filler content | wt % | — | — | — | — | — | — | — | 20 |
| Melt flow index (190° C., 2.16 kg) | g/10 min | 17.5 | 7.0 | 5.5 | 6.3 | 6.5 | 8.5 | not measured | not measured |
| Melt flow index (230° C., 2.16 kg) | g/10 min | 30 | not measured | 13.2 | 15.5 | 16.4 | 24 | 6.7 | 13 |
| density | g/cm$^3$ | 1.00 | 0.985 | 0.912 | 0.906 | 0.907 | 0.906 | 1.00 | 1.04 |
| Flexural modulus | MPa | 3500 | 2546 | 1336 | 1128 | 1149 | 1220 | 3000 | 2500 |
| charpy impact notched at 23° C. | KJ/m$^2$ | 3 | 4.3 | 17.5 | 23.6 | 23.3 | 10.1 | 3.6 | 4.5 |

From table 2 it can be seen that, for a similar density and a similar weight content of bamboo fibers, the inventive composition E1 shows improvements in the melt flow index and in the flexural modulus compared to C1.

The other inventive compositions E2 to E6 have weight content of bamboo fibers lower than C1. E2 to E6 show improvement of the density, therefore a reduced weight.

E2 shows a clear improvement in the processability (higher melt flow index) and in the impact properties compared to C1. When compared to C2, the inventive composition E2 shows a clear improvement regarding the density.

Where the inventive compositions comprise from more than 17 to 40 wt %, preferably 18 to 40 wt %, of bamboo fibers, improved melt flow index of at least 7 g/10 min (measured at 190° C. under a load of 2.16 kg) or of at least 15 g/10 min (measured at 230° C. under a load of 2.16 kg) can be achieved. The flexural modulus (stiffness) of the compositions is at least 2500 MPa.

Better results with respect to the density are achieved for the inventive compositions comprising from 2 to 17 wt % of bamboo fibers, i.e. E3 to E6, in comparison to C1 and C2. Improvement in the processability (melt flow index) is achieved in particular with respect to C1, while acceptable stiffness is kept. Improvement in the impact properties can also be noted. For the inventive compositions comprising from 2 to 17 wt % of bamboo fibers the Charpy notched (at 23° C.) is at least 8 kJ/m$^2$, preferably at least 10 kJ/m$^2$. For the inventive compositions comprising from 2 to 17 wt % of bamboo fibers the Charpy notched (at −20° C.) is at least 3.5 kJ/m$^2$, preferably at least 4 kJ/m$^2$. The flexural modulus (stiffness) of the compositions is at least 1100 MPa Comparison between E4 and E5 shows that, according to the invention, the pre-drying step of the bamboo fibers before being introduced into the extruder can be optional.

Injection Moulding

After being extruded, inventive compositions E3 to E6 have been dried 16 hours at 60° C. before being injected at 200° C. With preference the temperature of injection is at most 200° C. to avoid burning of the bamboo fibers.

The determination of the tensile properties of the injected products has been made in accordance with ISO 527-2 (2012)? The sample's length was 50 mm. Results are reported in table 3.

TABLE 3

|  | unit | E1 | E3 | E4 | E5 | E6 |
|---|---|---|---|---|---|---|
| Tensile modulus | MPa | 3300 | 1356 | 1110 | 1134 | 1306 |
| Tensile strength at yield (Rm) | MPa | 34 | 20.71 | 19.36 | 19.42 | 22.27 |
| Elongation at yield | % | not measured | 4.53 | 5.03 | 4.83 | 4.03 |
| Tensile stress at break (FR) | MPa | 34 | 19.07 | 17.16 | 17.18 | 20.03 |

From the above examples, it can be seen that the articles produced by injection molding, from inventive compositions comprising from 2 to 17 wt % of bamboo fibers, show a tensile modulus of at least 1100 MPa and a tensile strength of at least 19 MPa. The elongation at tensile strength is at least 4%. Whereas the articles produced by injection molding, from inventive compositions comprising from more than 17 wt % to 40 wt %, preferably 18 to 40 wt %, of bamboo fibers, show a tensile modulus of at least 2500 MPa, preferably at least 3000 MPa and a tensile strength of at least 20 MPa, preferably at least 30 MPa.

The mechanical properties of articles produced from inventive compositions comprising from 2 to 17 wt % of bamboo fibers, for example E3 et E4, allow said articles to be used in the automotive industry as trim, in particular as interior automotive trims which require high impact behavior.

The mechanical properties of articles produced from inventive compositions comprising from more than 17 wt % to 40 wt %, preferably 18 to 40 wt % of bamboo fibers, for example E1, allow said articles to be used in the automotive industry as structural elements which require high stiffness.

The invention claimed is:
1. A composition comprising:
   a) at least 50 weight percent (wt %) relative to a total weight of the composition of a heterophasic propylene copolymer, wherein the heterophasic propylene copolymer has a melt flow index measured at 230° C. under a load of 2.16 kg according to ISO 1133, condition L, of at least 15 g/10 min, and is a product of a polymer blend comprising from 50 to 98 wt % of a first polymer and from 2 to 50 wt % of a second polymer, wherein the first polymer is a first heterophasic propylene copolymer having a melt flow index measured at 230° C. under a load of 2.16 kg according to ISO 1133, condition L, in a range of from 5 to 25 g/10 min, and wherein the second polymer is a second heterophasic propylene copolymer having a melt flow index measured at 230° C. under a load of 2.16 kg according to ISO 1133, condition L, of greater than 25 g/10 min;
  b) from 2 to 40 wt % relative to the total weight of the composition of bamboo fibers, wherein the bamboo fibers have an average length in a range of from 1000 µm to 1500 µm;
  c) from 0.1 to 10 wt % relative to the total weight of the composition of a coupling agent; and
  d) from 0 to 30 wt % relative to the total weight of the composition of an inorganic filler;
  wherein the composition exhibits the following properties:
    a melt flow index that is at least 5 g/10 min at 190° C. under a load of 2.16 kg according to ISO 1133, condition L;
    a density that is in the range of 0.900 and 1.010 g/cm$^3$ according to ISO 1183;
    a flexural modulus that is in the range of 1100 MPa and 4000 MPa according to ISO 178; and
    a charpy impact strength notched of the composition at 23° C. according to ISO 179 of at least 3 kJ/m$^2$.

2. The composition according to claim 1, wherein the composition comprises from 2 to 17 wt % of bamboo fibers, and wherein the charpy impact strength notched of the composition at 23° C. according to ISO 179, is at least 8 kJ/m$^2$.

3. The composition according to claim 1, characterized in that the charpy impact strength notched of the composition at −20° C. according to ISO 179, is at least 3.5 kJ/m$^2$.

4. The composition according to claim 1, characterized in that the melt flow index of the composition measured at 190° C. under a load of 2.16 kg according to ISO 1133, condition L, is at least 6 g/10 min.

5. The composition according to claim 1, wherein the heterophasic propylene copolymer comprises a polypropylene in a matrix phase and a rubber in a dispersed phase, characterized in that
  the polypropylene in the matrix phase comprises propylene and at most 1 wt %, relative to a total weight of the composition, of one or more comonomers selected from the group consisting of ethylene and $C_4$-$C_{10}$ alpha-olefins; and
  the rubber in the dispersed phase is present in an amount of from at least 5 wt % to at most 30 wt % relative to the total weight of the heterophasic propylene copolymer.

6. The composition according to claim 1, characterized in that the heterophasic propylene copolymer exhibits the following properties:
  a flexural modulus of at least 850 MPa and at most 1800 MPa; and
  a density of at least 0.890 g/cm$^3$.

7. The composition according to claim 1, characterized in that the composition comprises from 2 to 17 wt % of bamboo fibers.

8. The composition according to claim 1, characterized in that the coupling agent is maleated polypropylene (MAPP).

9. The composition according to claim 8, wherein a content of maleic anhydride (MAH) is at least 1 wt % relative to the total weight of the MAPP.

10. The composition according to claim 1, wherein the composition comprises at most 6 wt % relative to the total weight of the composition of the coupling agent.

11. The composition according to claim 1, wherein the composition comprises from 1 to 30 wt % relative to the total weight of the composition of the inorganic filler.

12. A method of forming a composition, the method comprising:
  introducing a heterophasic polypropylene copolymer and a coupling agent into an extruder through a first feed port to form a mixture, wherein the heterophasic polypropylene copolymer has a melt flow index measured at 230° C. under a load of 2.16 kg according to ISO 1133, condition L, of at least 15 g/10 min, and is a product of a polymer blend comprising from 50 to 98 wt % of a first polymer and from 2 to 50 wt % of a second polymer, wherein the first polymer is a first heterophasic propylene copolymer having a melt flow index measured at 230° C. under a load of 2.16 kg according to ISO 1133, condition L, in a range of from 5 to 25 g/10 min, and wherein the second polymer is a second heterophasic propylene copolymer having a melt flow index measured at 230° C. under a load of 2.16 kg according to ISO 1133, condition L, of greater than 25 g/10 min;
  mixing the mixture to a molten state;
  kneading the molten mixture with bamboo fibers and optionally an inorganic filler, wherein the bamboo fibers have an average length in a range of from 1000 µm to 1500 µm, wherein the bamboo fibers and the optional inorganic filler are introduced into the extruder through a second feed port located downstream of the first feed port.

13. The method according to claim 12, wherein the composition comprises:
  at least 50 wt % relative to a total weight of the composition of the heterophasic propylene copolymer;
  from 2 to 40 wt % relative to the total weight of the composition of the bamboo fibers;
  from 0.1 to 10 wt % relative to the total weight of the composition of the coupling agent; and
  from 0 to 30 wt % relative to the total weight of the composition of the inorganic filler;
  wherein the composition exhibits the following properties:
    a melt flow index that is at least 5 g/10 min at 190° C. under a load of 2.16 kg according to ISO 1133, condition L;
    a density that is in the range of 0.900 and 1.010 g/cm$^3$ according to ISO 1183;
    a flexural modulus that is in the range of 1100 MPa and 4000 MPa according to ISO 178; and
    a charpy impact strength notched of the composition at 23° C. according to ISO 179 of at least 3 kJ/m$^2$.

14. The method according to claim 12, characterized in that the bamboo fibers are introduced into the extruder in an unpre-dried state.

15. A method comprising:
  producing a molded article from a composition;
  wherein the composition comprises:
    at least 50 weight percent (wt %) relative to a total weight of the composition of a heterophasic propylene copolymer, wherein the heterophasic propylene copolymer has a melt flow index measured at 230° C.

under a load of 2.16 kg according to ISO 1133, condition L, of at least 15 g/10 min, and is a product of a polymer blend comprising from 50 to 98 wt % of a first polymer and from 2 to 50 wt % of a second polymer, wherein the first polymer is a first heterophasic propylene copolymer having a melt flow index measured at 230° C. under a load of 2.16 kg according to ISO 1133, condition L, in a range of from 5 to 25 g/10 min, and wherein the second polymer is a second heterophasic propylene copolymer having a melt flow index measured at 230° C. under a load of 2.16 kg according to ISO 1133, condition L, of greater than 25 g/10 min;

from 2 to 40 wt % relative to the total weight of the composition of bamboo fibers, wherein the bamboo fibers have an average length in a range of from 1000 µm to 1500 µm;

from 0.1 to 10 wt % relative to the total weight of the composition of a coupling agent; and from 0 to 30 wt % relative to the total weight of the composition of an inorganic filler;

and wherein the composition exhibits the following properties:

a melt flow index that is at least 5 g/10 min at 190° C. under a load of 2.16 kg according to ISO 1133, condition L;

a density that is in the range of 0.900 and 1.010 g/cm$^3$ according to ISO 1183;

a flexural modulus that is in the range of 1100 MPa and 4000 MPa according to ISO 178; and a charpy impact strength notched of the composition at 23° C. according to ISO 179 of at least 3 kJ/m$^2$.

16. The method according to claim 15, wherein producing the molded article from the composition comprises injection molding the composition to form an injection molded article.

17. An article comprising a composition, wherein the composition comprises:

at least 50 weight percent (wt %) relative to a total weight of the composition of a heterophasic propylene copolymer, wherein the heterophasic propylene copolymer has a melt flow index measured at 230° C. under a load of 2.16 kg according to ISO 1133, condition L, of at least 15 g/10 min, and is a product of a polymer blend comprising from 50 to 98 wt % of a first polymer and from 2 to 50 wt % of a second polymer, wherein the first polymer is a first heterophasic propylene copolymer having a melt flow index measured at 230° C. under a load of 2.16 kg according to ISO 1133, condition L, in a range of from 5 to 25 g/10 min, and wherein the second polymer is a second heterophasic propylene copolymer having a melt flow index measured at 230° C. under a load of 2.16 kg according to ISO 1133, condition L, of greater than 25 g/10 min;

from 2 to 17 wt % relative to the total weight of the composition of bamboo fibers, wherein the bamboo fibers have an average length in a range of from 1000 µm to 1500 µm;

from 0.1 to 10 wt % relative to the total weight of the composition of a coupling agent; and from 0 to 30 wt % relative to the total weight of the composition of an inorganic filler;

and wherein the composition exhibits the following properties:

a melt flow index that is at least 5 g/10 min at 190° C. under a load of 2.16 kg according to ISO 1133, condition L;

a density that is in the range of 0.900 and 1.010 g/cm$^3$ according to ISO 1183;

a flexural modulus that is in the range of 1100 MPa and 4000 MPa according to ISO 178; and a charpy impact strength notched of the composition at 23° C. according to ISO 179 of at least 8 kJ/m$^2$.

18. The article according to claim 17, wherein the article is an injection molded article.

19. The article according to claim 17, characterized in that the article is an automotive trim, an interior automotive trim, or an automotive structural element.

* * * * *